United States Patent [19]
Desiro

[11] Patent Number: 4,769,888
[45] Date of Patent: * Sep. 13, 1988

[54] METHOD AND APPARATUS FOR RADIATOR RECORING

[76] Inventor: Richard Desiro, 42995 Ambridge, Northville, Mich. 48167

[*] Notice: The portion of the term of this patent subsequent to Oct. 25, 2000 has been disclaimed.

[21] Appl. No.: 32,965

[22] Filed: Apr. 1, 1987

Related U.S. Application Data

[60] Continuation of Ser. No. 545,223, Oct. 25, 1983, abandoned, which is a division of Ser. No. 268,551, Jun. 1, 1981, Pat. No. 4,411,414.

[51] Int. Cl.⁴ .............................................. B23P 15/26
[52] U.S. Cl. .............................. 29/157.3 R; 29/157.4; 29/726; 269/71; 269/237; 269/258; 269/156
[58] Field of Search ................... 29/727, 726, 157.3 A, 29/157.3 B, 157.3 C, 157.4, 464, 469, 157.3 R; 228/183, 184; 248/213.3, 213.4, 316.1; 269/46, 71, 155, 237, 258, 156

[56] References Cited

U.S. PATENT DOCUMENTS

| | | | |
|---|---|---|---|
| 1,869,195 | 7/1932 | Healy | 29/727 |
| 3,472,316 | 10/1969 | Couch, Jr. | 29/157.4 X |
| 3,567,044 | 3/1971 | Travis | 29/726 |
| 4,324,393 | 4/1982 | Chausse | 269/46 |
| 4,371,106 | 2/1983 | Chapman | 269/46 X |
| 4,411,414 | 10/1983 | Desiro | 269/71 |
| 4,530,492 | 7/1985 | Bork | 269/71 X |

FOREIGN PATENT DOCUMENTS 996162 2/1983 U.S.S.R. ............................... 29/727

Primary Examiner—Mark Rosenbaum
Assistant Examiner—Joseph M. Gorski
Attorney, Agent, or Firm—Remy J. VanOphem

[57] ABSTRACT

A method and an apparatus for repair of automotive radiators is disclosed, usable for recoring of either brass or plastic tank radiators, including clamping gates providing parallel rails adjustably spaced to receive the radiator header with an air cylinder exerting clamping pressure on the tank top. The radiator sits atop the rails of a first set of clamping gates when resoldering conventional tanks and is recessed between the rails of a second set of clamping gates which are alternatively installed for decrimping and crimping of the header tabs of plastic tank radiators. Decrimping and crimping hand tools of special configuration are also disclosed, cooperating with the rails during use.

19 Claims, 4 Drawing Sheets

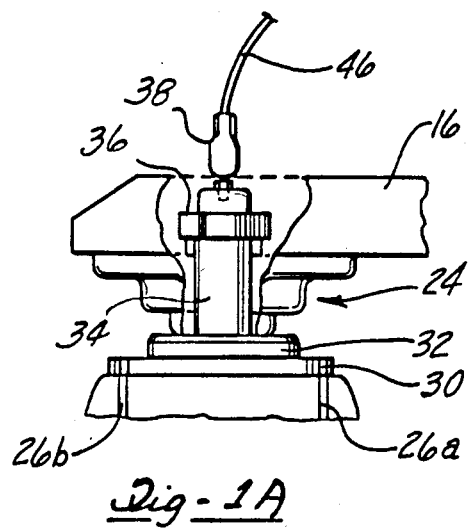
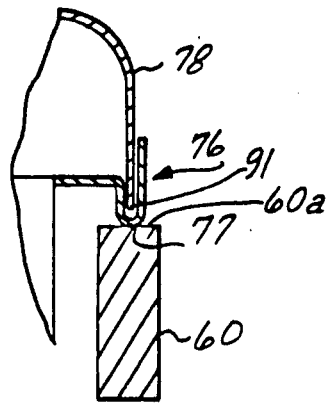
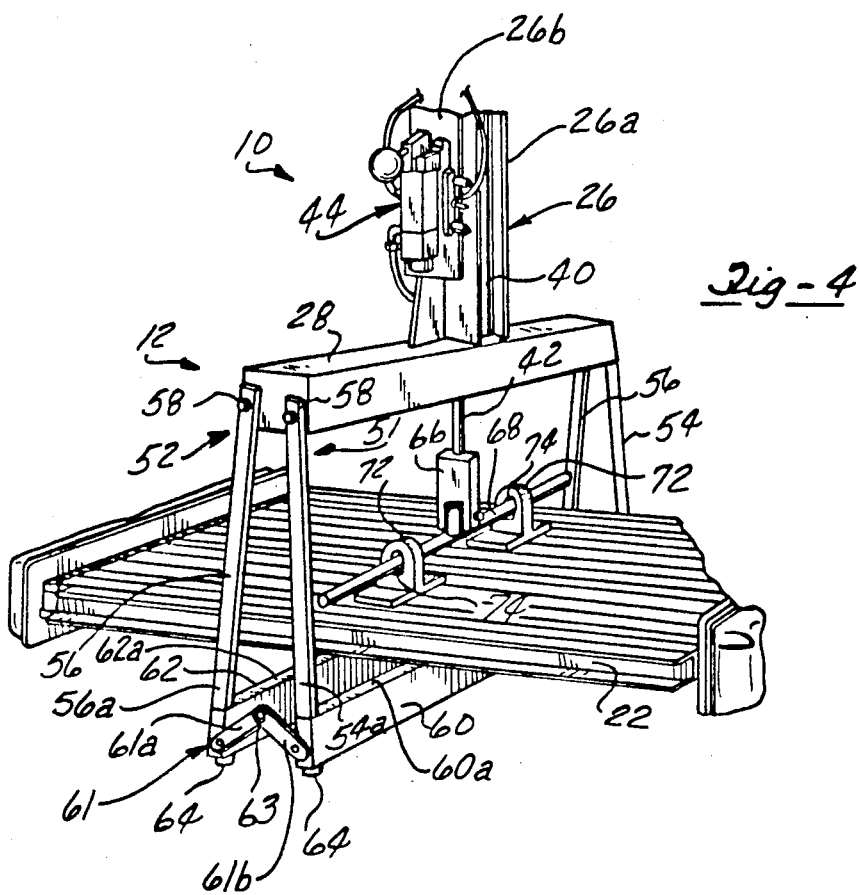

METHOD AND APPARATUS FOR RADIATOR RECORING

This is a continuation of application Ser. No. 545,223, filed Oct. 25, 1983, now abandoned.

BACKGROUND OF THE INVENTION

The present invention concerns repair of automotive radiators and more particularly concerns a method and an apparatus for recoring radiators.

In the course of repairing such radiators a recoring is often found to be necessary in which the tube-and-fin "core" of the radiator is removed from the top and bottom tanks. Conventional radiator construction includes a tank joined to the core by means of a header which receives the core tubes and forms the bottom of the tank when the tank is mounted within the header. The most common radiator construction currently employed includes a brass tank which is soldered to the header. In recoring the radiator, the soldered joint is loosened for removal of the tank. Upon completion of the recoring, the tank is placed into the header and the solder connection rerun.

Recently there has developed a trend towards replacement of the brass tank with a plastic tank mechanically joined to the header. The plastic tank is positioned against a gasket received in a header recess. A tank flange is compressed against the gasket and secured in position with a series of tabs formed integrally with the header, which are bent down to retain the tank compressed against the gasket.

Radiator repair shops have, for the most part, relied on impromptu fixturing for conducting these operations.

Reassembly of the brass tank to the header has often involved difficulties due to deformation of the tank bottom or slight irregularities in the header recess receiving the tank lip, such that the application of pressure is necessary in order to get the tank to properly seat. In addition, there sometimes exists excessive clearance between the tank lip and the header tank recess, in turn resulting in a weaker solder joint. The handling of the disassembly and reassembly of the tank and radiator core and header is relatively difficult and slows completion of the recoring.

Plastic tank designs have presented their own peculiar problems in recoring, particularly in crimping and decrimping of the tabs while properly insuring a seal of the tank bottom against the gasket and the header.

The crimped tabs are difficult to loosen because they are often jammed tightly into the plastic tank, with minimal clearance between the tank side wall and the tab end, making it difficult to obtain insertion of a tool for decrimping. The compression of the tank against the gasket further aggravates the problem due to the tightness with which the tabs are forced against the tank flange.

To obtain a proper seal between the header and tank is also troublesome since, if the header recess receiving the gasket is deformed, leakage will often occur. Such deforming can be inflicted by the decrimping operation or the subsequent crimping operation due to pressure exerted by hand tools on the outer edge of the header.

In addition, the entire tank crimping and decrimping operations are relatively time consuming, thereby increasing the cost of labor to recore.

Previous attempts at improving the above described fixture assemblies and fixturing methods have generally not alleviated the time problem and involve relatively costly fixturing which has not successfully speeded up the disassembly or assembly steps. It has also not satisfactorily handled the problem of insuring leak free connections from the tank to the header.

In addition, the radiator repair industry is faced with the task of being prepared to repair and recore efficiently both the conventional brass tank and the newer plastic tank radiator.

Such plastic tanks are, in the United States, only now beginning to exist in commercially relevant quantities, but ultimately may account for much of radiator repairs.

In the interim period, both types of radiators will necessarily need to be accommodated. The necessary fixturing apparatus is relatively costly, and represents a sizable capital investment for businesses having limited financial resources, such as the typical radiator repair shop. It is, therefore, important that any fixturing apparatus intended for that application be adaptable to both tank mounting styles.

The decrimping and crimping tools heretofore employed have either been conventional hand tools, such as vise grips pressed into service for this purpose, or have been specially designed pneumatic tools. In the case of the conventional hand tools, these do not efficiently perform the crimping and decrimping operations and, therefore, require excessive labor. The conventional pneumatic tools, on the other hand, are relatively difficult to control and often apply excessive force to the tab, due to a lack of "feel" associated with their manipulation.

Accordingly, it is an object of the present invention to provide a fixturing apparatus and method for the recoring of radiators which is adaptable to both conventional and plastic tank construction and which further is adaptable to the wide variety of radiator tank sizes and configurations that exist, such that a simple universal fixture can be employed in recoring radiators of all types.

A further object of the present invention is to provide such a fixturing apparatus and method which greatly facilitates the recoring operation of radiators of both metal and plastic tank construction.

It is still another object of the present invention to provide decrimping and crimping hand tools for use with the fixturing apparatus and method in order to efficiently and rapidly conduct the crimping and decrimping steps incidental to recoring of the plastic tanks.

SUMMARY OF THE INVENTION

These and other objects of the present invention, which will become apparent upon a reading of the following specification and claims, are achieved by a fixture assembly consisting of first and second sets of adjustably mounted rails which are of two differing configurations, one each adapted to conventional tank radiators and the other to the plastic tank radiator construction, respectively. The rails are adapted to receive the radiator heater, with a hold down means, such as an air cylinder hold down arrangement, adapted to exert pressure on the top of the tank in both the conventional and plastic tank applications. In the conventional tank construction, the rails are configured such that the radiator header sits atop each side rail, while in the plastic tank application configuration, a recess is provided with the header received thereinto to be roughly even with the top surface of the rails to provide protection for the header seal channel and to cooperate with the crimping and decrimping hand tools.

The pairs of rails are supported by pairs of pivoted arms downwardly extending from a cross member to form clamping gates, swingably mounted for movement toward and away from each other so as to be adjustable to radiator headers of varying widths. Mounted atop the cross member is an air cylinder having a downwardly extending operating rod to which is pinned a cross bar slidably receiving a pair of tee-shaped hold down elements, each of the hold down elements being slidably received on the cross bar via elongated openings accommodating tilting as well as sliding movements thereof. Each of the hold down elements is adapted to be positioned at longitudinally spaced points atop the radiator tank when the radiator is positioned on the rails to secure the radiator in position.

The entire assembly of the rails, arms, cross members and air cylinder may be mounted for rotation by means of a bearing assembly to allow the radiator, when clamped in place, to be pivoted for ready access to the radiator from all sides by the repairman.

For this purpose, the assembly is mounted from above by a cantilevered beam supported on an upstanding frame section adapted to support the radiator above the shop floor at a convenient height.

For conventional brass tanks, the header sits atop each of the rails and the hold down elements are positioned to exert a pressure on the tank top, upon actuation of the air cylinder, forcing the tank lower edge or lip into a receiving header recess. The air cylinder pressure exerted causes the header lip to compress slightly about the edge to reduce the clearance space and improve the soldered connection.

In the plastic tank application, the first set of clamping gates are placed with a second set having rails formed with a shoulder recess extending along the adjacent sides and top thereof, which is adapted to receive the header to place the tank flange roughly even with the top of the rails. The air cylinder and hold down fixtures compress the tank against the gasket and enable ready decrimping of the tabs forming a part of the header.

The decrimping tool which is employed preferably consists of a bar section with a handle at one end extending from one side of the section. The bar section is formed with a slot receiving a pivoted trigger rod. The opposite end of the bar section is formed with an oppositely extending anchor block, having a through bore receiving a spring-loaded plunger with one end engaged with the trigger rod, such as to be caused to be extended forwardly of the anchor block. The anchor block is also formed with an inclined mounting surface to which is mounted a downwardly extending hook finger. A knob is also mounted atop the anchor block.

In use, the decrimping tool plunger is positioned against the rail, the hook finger in registry with the tab to be decrimped, the finger being inserted behind the tab end and the tank side, held down with pressure on the knob. Squeezing of the trigger rod and extension of the plunger produces outward pressure between the finger and the tab, and pivoting movement of the decrimping tool enables ready bending upwardly of each of the tabs.

The crimping tool consists of a handle-frame to which is joined an angled clevis, to which, in turn, is pivotally mounted a swing bar to which is affixed a finger-lever including a rearwardly extending lever rod and a forwardly extending finger. A channel block is mounted across the clevis ends and adapted to be positioned beneath the rails which are thereby positioned between the finger and the channel block. In use, the tool is positioned with the crimping finger in registry with a tab to be crimped, the lever rod being manipulated downwardly while the handle is pulled upwardly to rotate the tool with respect to the rail and cause a neat rolling over of the tab into the crimped position.

BRIEF DESCRIPTION OF THE DRAWINGS

In the drawings appended hereto:

FIG. 1a is an enlarged, fragmentary and partially broken away view of a portion of the fixturing apparatus shown in FIG. 1;

FIG. 3 is a partial sectional view through the rail of the fixturing apparatus of FIG. 1 and through the radiator tank and the header of the radiator therein, and depicts the relationship of the tank, the header and the rail adapted for recoring of brass tank radiators;

FIG. 4 is a perspective fragmentary view of the fixturing apparatus of FIGS. 1 and 2 with the radiator positioned therein for the making of the tank connections;

DETAILED DESCRIPTION OF THE PREFERRED EMBODIMENT

In the following description certain specific terminology will be employed, and specific embodiments will be described in accordance with the requirements of 35 USC 112, but it is to be understood that the description is not intended to be limiting and, indeed, should not be so construed inasmuch as the present invention is capable of taking many forms and variations within the scope of the appended claims.

Figure 1:
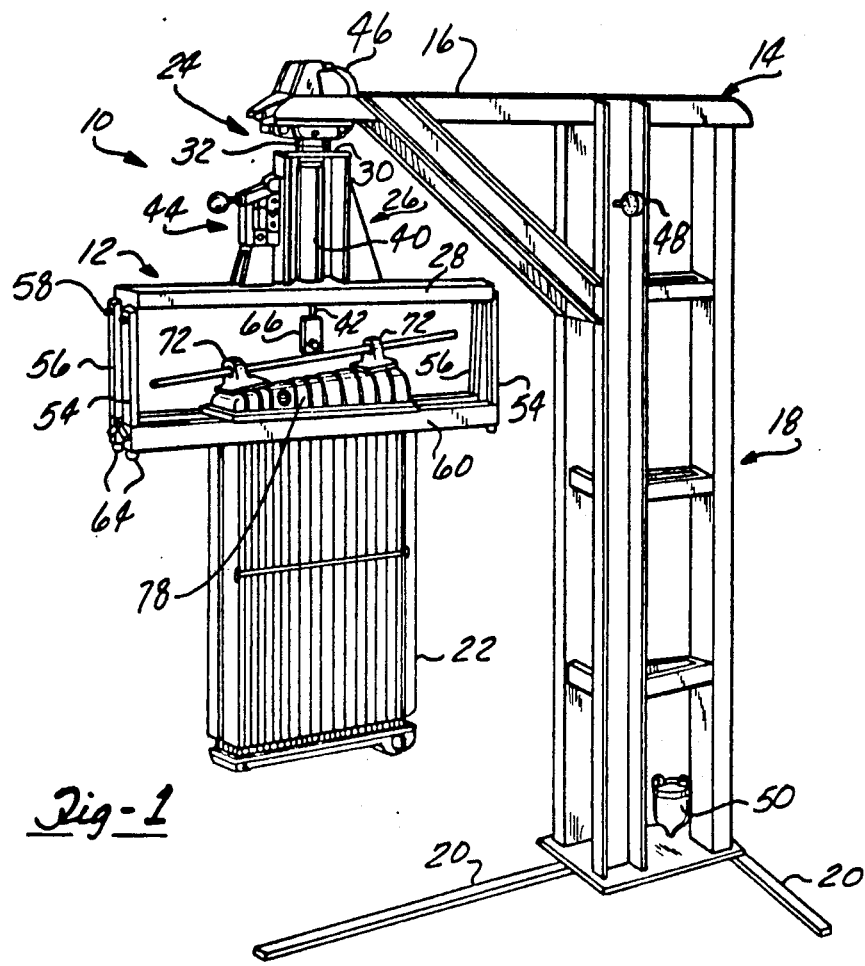
FIG. 1 is a perspective view of the fixturing apparatus according to the present invention.

Referring to the drawings and particularly FIG. 1, the fixturing apparatus 10 according to the present invention includes a clamping fixture 12 suspended from a support frame 14 which includes a cantilevered beam 16 extending outwardly from an upright framework 18 adapted to be stably supported on a shop floor surface by outriggers 20. The clamping fixture 12 in this embodiment is designed to be rotatably mounted, as will be described later herein, on the cantilevered beam 16 such as to enable ready access to a radiator 22 which is mounted to the clamping fixture 12.

The clamping fixture 12 includes a support bracket 26 welded to a cross beam 28. The support bracket 26 includes a top plate 30 and a collar 32 integral with a trunnion shaft 34, as shown in FIG. 1A. The support bracket 26 also includes a retaining collar 36 acting to suspend the clamping fixture on a bearing assembly 24.

A suitable pneumatic swivel 38, as shown only in FIG. 1A, is provided allowing connection of the pneumatic lines 46 to an air cylinder 40.

Figure 2:
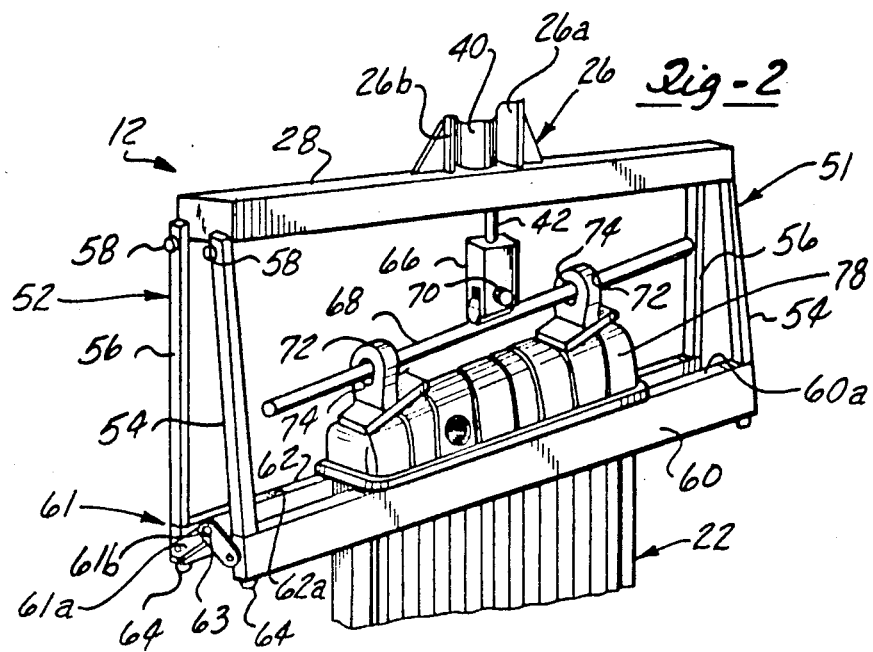
FIG. 2 is an enlarged view of the fixturing apparatus of FIG. 1 with a conventional radiator clamped in position.

The air cylinder 40 is mounted intermediate the sides 26a and 26b of the support bracket 26, as best shown in FIG. 4, and atop the cross beam 28. The actuating rod 42 of the air cylinder 40 extends through an opening in the cross beam 28, such as to extend therebelow, as depicted in FIGS. 1, 2 and 4. Control means 44, illustrated in FIGS. 1 and 4, are also mounted to the support bracket 26, enabling selecting actuation of the air cylinder 40 to provide upward or downward motion or to maintain the position of the actuating rod. The air cylinder 40 is supplied with air pressure via the pneumatic line 46, as shown in FIGS. 1 and 1A, which is connected to a suitable pressure gage 48 and to a regulator, filter and lubricator 50, each depicted in FIG. 1.

The clamping fixture 12 also includes a pair of clamping gates 51 and 52, best shown in FIG. 4. Each of the clamping gates 51 and 52 is swingably and detachably mounted on the cross beam 28 by pairs of downwardly extending arms 54 and 56, respectively, pivoted on either end of the cross beam 28 with cap screws 58. Each of the clamping gates 51 and 52 also includes a first parallel set of side rails 60 and 62, respectively, connected to the lower ends 54a and 56a of the arms 54 and 56 by means of cap screws or bolts 64. The adjacent surfaces of the side rails 60 and 62 are squared off so as to insure that the edges of the header 76 will securely sit atop the side rails 60 and 62 even with radiator configurations having only limited overhang of the headers.

A clevis end 66 is also provided for the actuating rod 42 of the air cylinder 40, which, in turn, is pinned at 70 to a clamping bar 68, as shown in FIG. 2. The clamping bar 68 has slidably disposed thereon a pair of hold down elements 72. Each of the hold down elements 72 has an elongated opening 74 through which the clamping bar 68 passes and the elongation of which allows tilting movement, as best seen in FIG. 2, to accommodate the many variations of surface contours among differing models of the radiators 22 to be disposed therein.

This provides an extremely efficient and adaptable clamping arrangement and does not require separate fixturing for each of the great number of variations in tank top contours.

In addition, the disposition of the radiator 22 between the side rails 60 and 62, which are adjustably mounted for movement towards and away from each other, allows for accommodation of the differing widths and depths of radiators such as to constitute a "universal" fixture arrangement.

As shown in FIGS. 2 and 4 the clamping gates 51 and 52 are secured in adjusted positions by a toggle linkage 61. The toggle linkage 61 includes links 61a and 61b pivotally mounted to each side rail 60 and 62, and pivotally mounted to each other by an adjustment bolt 63, tightening of which will maintain an adjusted position. This enables adjustment of the positions to accommodate the various radiator widths, such as to correctly position the top surface 60a and 62a of each of the side rails 60 and 62, respectively, in the case of usage for a convenient tank-header construction. As best seen in FIG. 3, the lower edge 77 of the header 76 is positioned on the top surface 60a of the side rail 60. Thereafter, the control means 44 is actuated to cause the air cylinder 40 to be pressurized, forcing the hold down elements against the top of the tank 78.

In use, a new core and header is positioned between the side rails 60 and 62, with the downwardly extending arms 54 and 56 swung into the correct position such that the lower edge 77 of the header 76 sits atop either of the side rails 60 or 62, as shown in FIGS. 1, 2, and 3. The tank 78 is positioned with the lower edge of the side rails thereof disposed above the receiving recess 91 formed by the outer lip of the header 76, as shown.

The control means 44 is then actuated such that the air cylinder 40 is pressurized, forcing the hold down elements 72 to force the tank 78 downwardly into the recess 91 formed by the outer lip of the header 76. This overcomes any tendency for slight irregularities of contour to prevent reinsertion of the tank 78, with the uniform pressure exerted by the arrangement tending to provide excellent seating.

The pressure also tends to draw the header 76 and the bottom edge of the tank 78 into closer juxtaposition, to reduce the clearance space and enable better solder connections to be made.

The level of air pressure is adjustable by means of the regulator 50. The soldered joint may conveniently be made from one side by rotation of the radiator 22 in the fixture through an angle of 360°, to greatly enhance the workman's efficiency in executing this step. As seen in FIG. 4, the fixturing apparatus 10 may also be advantageously employed to make the inlet and outlet soldered connections, by positioning the radiator 22 on its face over the side rails 60 and 62 and actuating the air cylinder 40 to hold the radiator 22 securely.

It is noted that soldering flux is corrosive to aluminum but adhesion of the solder to the side rails 60 and 62 must be avoided in order that the header is not soldered to the side rails. Thus, the side rails 60 and 62 are preferably constructed of stainless steel.

For this same reason, the same side rails 60 and 62 are not suitable for use with both brass tank and plastic tank radiators 22, since the latter commonly employ aluminum heders. Also, the recessed construction of the side rails 60 and 62 to be employed for the plastic tanks, as will be described below, is not suitable for use with the soldered connection tanks, as described above.

Figure 5:
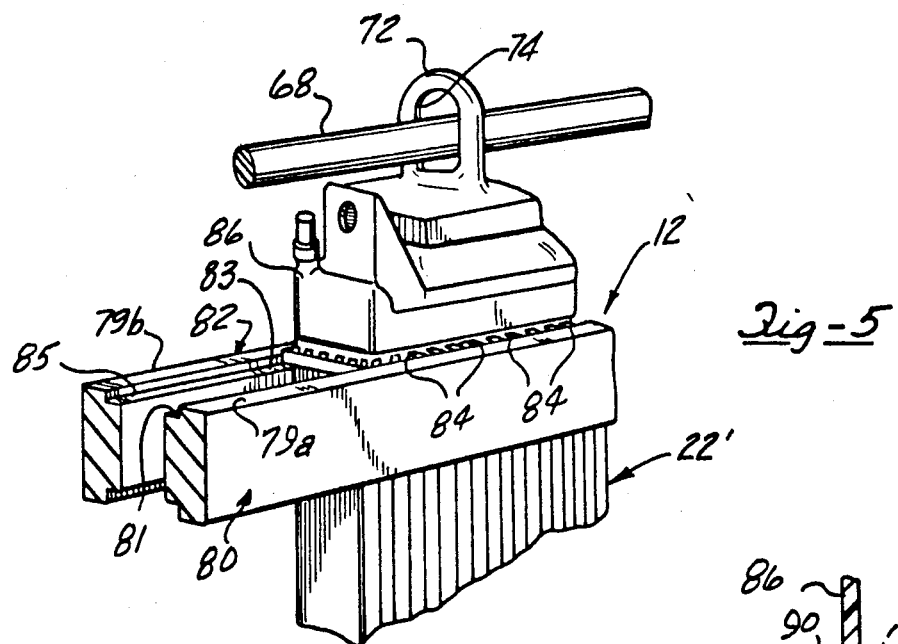
FIG. 5 is an enlarged fragmentary view of the rail and the hold down elements of the fixturing apparatus of FIG. 1 and shows a plastic tank positioned therein.
Figure 6:
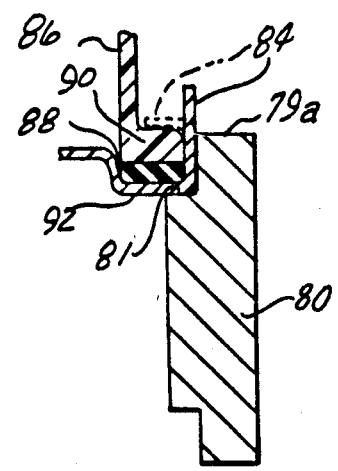
FIG. 6 is a fragmentary sectional view through the side rail, the tank and the header and illustrates the position of the plastic tank radiator installed in the fixturing apparatus according to the present invention.

Referring to FIG. 5, in order to convert the fixturing apparatus 10 to use with the plastic tank radiators 22, the clamping gates 51 and 52 having the first set of side rails 60 and 62 are replaced with a second set of side rails 80 and 82 having recesses 81 and 85 extending along their adjacent sides. As best shown in FIG. 5, the radiator header 83 is disposed between the side rails 80 and 82, and rests below the top surfaces 79a and 79b of the side rails 80 and 82 to position the tank flange 90 and the crimped tabs 84 to be roughly even with the top surfaces 79a and 79b of each of the side rails 80 and 82. The fixturing apparatus 10 is utilized both for disassembly and assembly of the plastic tank 86 to the header 83 and the radiator core.

To disassemble, the plastic tank 86 is engaged with the hold down elements 72 and the air cylinder 40 is actuated to create a downward pressure on a tank upper surface. This compresses the gasket 88 normally included in plastic tank designs and enables the tabs 84, which are in the crimped position, to be more readily decrimped by relieving the pressure on the crimped tabs 84 and producing clearance at the inside edge of the uncrimped tab 84 and between the tank flange 90 and the undersurface of the uncrimped tab. The positioning of the header seal channel 92 within the rail recesses 81 and 85 acts together with the pressure applied to the tank 86 to insure that the tabs 84 can be decrimped with minimal possibilities of producing deformation or distortion of the header seal channel 92. In connection therewith, it is noted that the radiator construction in such plastic tank radiators 22' includes the gasket 88 disposed within the header seal channel 92, and the proper sealing thereof depends critically on the undistorted state of the header seal channel 92.

Figure 7:
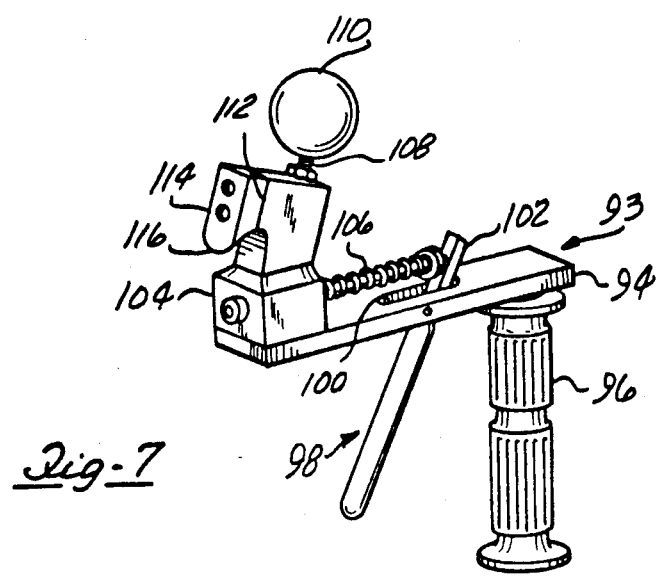
FIG. 7 is a view of a decrimping tool according to the present invention utilized with the fixturing apparatus according to the present invention.
Figure 8:
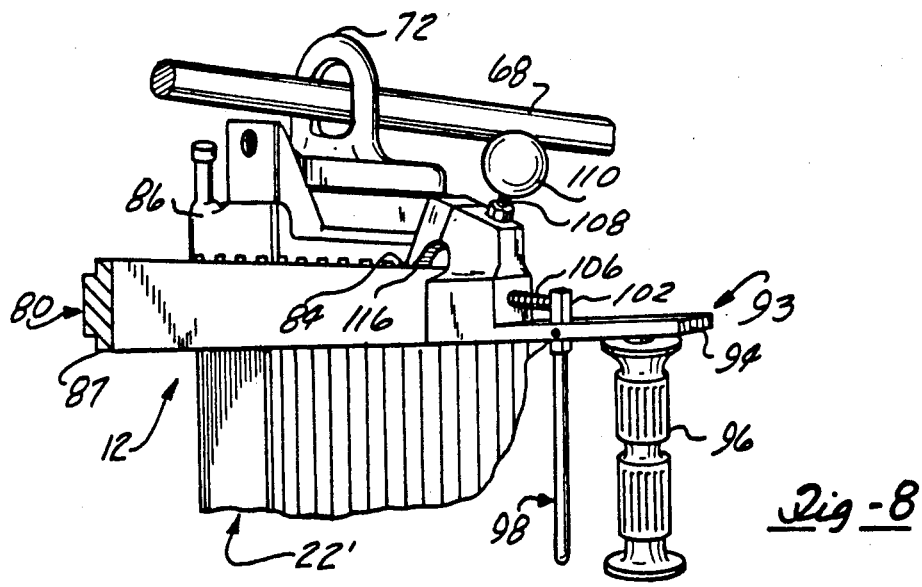
FIG. 8 is a perspective view of the decrimping tool of FIG. 7 shown in use.

Decrimping is executed by a specially designed tool shown in FIGS. 7 and 8. The decrimping tool 93 includes a tool frame consisting of an elongated generally rectangular-shaped aluminum bar section 94 having a gripping handle 96 extending at right angles to one end of the bar section 94. Intermediate the length of the bar section 94 is a pivotally mounted trigger pad or rod 98, having a lower trigger portion covered with a suitable grip and extending to be juxtaposed to the handle 96. The trigger rod 98 is received within an elongated slot 100 formed in the bar section 94, such as to accommodate pivoting movement thereof with an upper actuating portion 102 protruding above the top surface of the bar section opposite the handle 96. The bar section 94 at the opposite end from the handle 96 has welded thereto an anchor block 104 which is formed with a through bore receiving a spring loaded plunger 106 having one end disposed adjacent to the actuating portion 102 of the trigger rod 98, the opposite end protruding through the anchor block 104.

The anchor block 104 mounts a knob 110 secured with a stud 108 threadably received in the upper surface of the anchor block 104. The anchor block 104 also has a mounting surface 112 inclined slightly to the plunger 106 axis which serves to anchor a pry finger 114 of hardened steel and having a sharp projecting rounded end 116 extending towards the plunger 106 end projecting through the anchor block 104.

In use, the air cylinder 40 is pressurized after placing the radiator in the fixturing to compress the gasket. As shown in FIG. 8, the user grasps the handle 96 and applies downward pressure on the knob 110, with the nose being in registry behind the tab 84 to be decrimped. When the trigger rod 98 is squeezed, this forces the projecting end of the plunger 106 against the side rail 80 or 82 producing a contact pressure therebetween, such that downward tilting of the tool 93 causes quick and efficient decrimping.

Since the header is completely recessed within the recess 81 or 85, there is no possibility of distortion of the header seal channel 92. After decrimping, the tool 93 is simply successively moved along to the next tab 84 to continue the operation until all the side located tabs 84 are decrimped. The end tabs 84 are decrimped with conventional hand tools. The plastic tank 86 is then lifted free for the recoring operation, including replacement of the gasket 88.

The header seal channel 92 may also be trued while positioned within the side rails 80 and 82 while resting in the fixturing by merely tooling the interior of the header seal channel 92, if any distortion has taken place.

The fixturing is also used to great advantage in reassembling the tank to the header and core by placing the plastic tank 86 atop the gasket 88, and reactivating the air cylinder 40 to apply a uniform compression of the plastic tank 86 on the gasket 88 prior to recrimping of the tabs 84.

Figure 9:
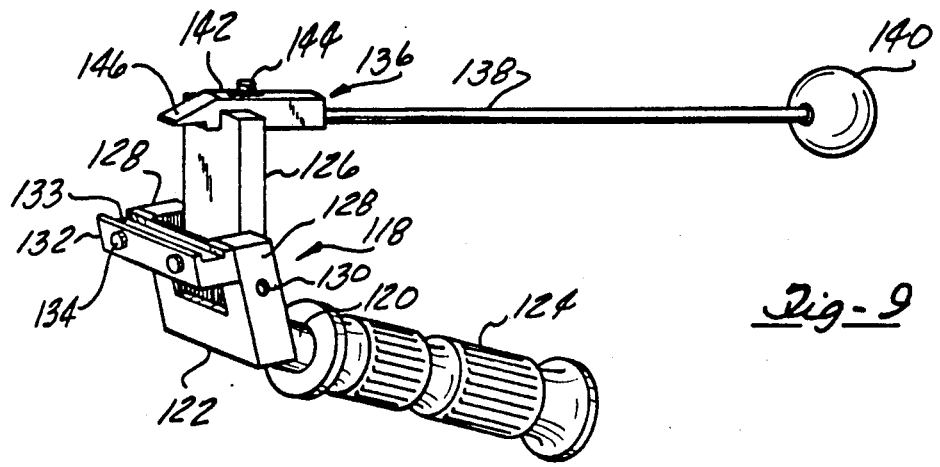
FIG. 9 is a perspective view of a crimping tool according to the present invention.
Figure 10:
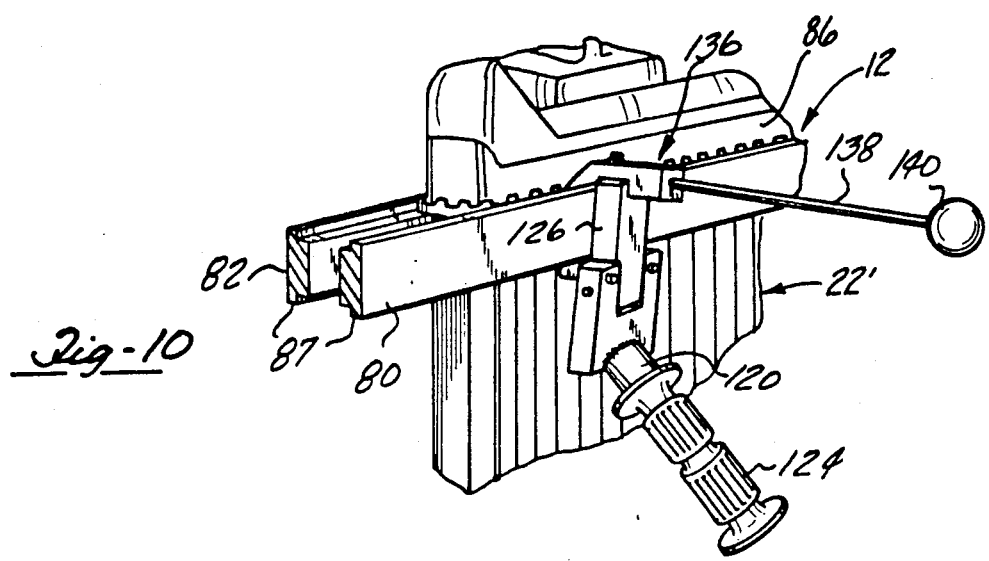
FIG. 10 is a perspective view of the crimping tool of FIG. 9 shown in use.

Recrimping of the tabs 84 is achieved by the use of a special crimping tool 118 also designed to cooperate with the side rails 80 and 82 as depicted in FIGS. 9 and 10. The crimping tool 118 consists of a handle rod frame 120 welded to an angled clevis 122, the rod 120 forming a handle with a hand grip 124 mounted thereto. The clevis 122 mounts a pivot bar 126 disposed between the two clevis ends 128 with a shoulder screw 130 being provided to provide the pivotal mounts.

A channel block 132 is provided and secured with cap screws 134 across the clevis ends 128 having a channel groove 133 configured to receive the lower surface of the rails 80 and 82. On the upper end of the pivot bar 126 there is mounted a lever arm 136 consisting of a handle rod 138 having a ball grip 140 at one end. A tool steel crimping bar 142 is mounted, by means of a cap screw 144, to the pivot bar 126, such as to form a connected assembly. The crimping bar 142 includes a wedge-shaped nose section 146 extending away from the pivot bar 126 in the same direction as the channel block 132, such as to enable straddling either of the side rails 80 and 82 therebetween.

For crimping, the air cylinder 40 is again pressurized with the tank and radiator in place to compress the gasket 88. To operate the crimping tool 118, as it is shown in FIG. 9, the repairman grasps the handle grip 124 of the crimping tool 118 with his right hand and positions the tool with the channel block 132 in with the nose section 146 in registry with a tab to be crimped. Upward pressure exerted on the lever arm 136 and downward pressure on the handle grip 124 with simultaneous upward rotation of the entire tool enables ready crimping of each tab 84. The end tabs are crimped with pliers or vise grips.

The imposition of a uniform pressure by the air cylinder and hold down elements insures proper sealing engagement with the tank flange 90 and the header seal channel during the crimping operation such that a reliable seal is obtained.

The radiator may be readily rotated facilitating the crimping of all the tabs about the periphery of the header.

It can be appreciated that the fixturing is readily adaptable to a great advantage in recoring both conventional tanks and plastic crimped tank construction, with the substitution of the rails configured for each application, and use of hand tools designed to cooperate with the specially configured rails. It has been found in practice that these operations are conducted very efficiently and effectively through the use of this equipment, which is relatively simply configured, rugged in construction, highly reliable, and suitable for usage in repair shops over an extended service life.

It can also be appreciated that the fixturing may be configured in a simplified and many alternate forms, if desired, such as by eliminating the rotational mount of the clamping fixturing.

What is claimed as novel is as follows:

1. A method of suspending a radiator of a type including a lower portion, a radiator header disposed above said lower portion and defining a peripheral flange extending outwardly horizontally beyond said lower portion, and a radiator tank interconnectable with said radiator header, said method comprising the steps of:

disposing said lower portion of said radiator between first and second rails, said first and second rails being disposed parallel to each other and being adjustably positionable relative to each other, each of said first and second rails having an upper surface;

adjustably positioning said first and second rails towards each other, thereby supporting a portion of said peripheral flange on the upper surface of each of said first and second rails; and displacing hold down means downwardly into engagement with said radiator tank, said hold down means being movably interconnected with said first and second rails, thereby exerting a downward pressure on said radiator tank which causes said radiator tank to exert a downward force on said radiator header.

2. The method of claim 1 further comprising after said step of displacing said hold down means the step of:

interconnecting said radiator tank and said radiator header.

3. The method of claim 1 further comprising, after said step of displacing said hold down means, the step of:

disconnecting said radiator tank and said radiator header from one another.

4. The method of claim 1 wherein said hold down means is displaceable by actuator means comprising a fluid pressure cylinder interconnected with said first and second rails and an actuator rod extending from said fluid pressure cylinder, said hold down means being interconnected with said actuator rod.

5. The method of claim 1 wherein said first and second rails are each pivotally interconnected with a cross member and extend downwardly therefrom, said hold down means being reciprocably interconnected with said cross member.

6. The method of claim 1 further comprising after said adjustably positioning step the step of:

locking said first and second rails against further inadvertent repositioning relative to each other.

7. A fixture assembly for recoring of a radiator of the type including a radiator header defining a peripheral flange and a radiator tank interconnected with said radiator header, said fixture assembly comprising:

a clamping fixture comprising a pair of rails movably interconnected with each other, each of said pair of rails having an upper surface, said pair of rails extending parallel to each other and being adjustably positionable relative to each other such as to receive a portion of said radiator therebetween and such as to receive at least a portion of said peripheral flange on said upper surfaces;

support frame means for supporting said clamping fixture above a supporting surface;

hold down means selectively engageable with said radiator header such as to exert a downward pressure on said radiator header when said radiator is mounted to said clamping fixture; and actuator means interconnected with said hold down means and selectively operable to exert a downward pressure on said hold down means.

8. The fixture of claim 7 wherein said clamping fixture further comprises a cross beam suspended from said support frame means and a pair of clamping gates, said pair of clamping gates including a pair of arms being pivotally mounted at one end to opposite ends of said cross beam, each of said pairs of arms being connected at the other end opposite said one end to opposite ends of one rail of said pair of rails to form said pair of clamping gates, said pair of arms being pivotally mounted to said cross beam ends to enable said swinging movements of said rails towards and away from each other to produce an adjustment movement therebetween.

9. The fixture of claim 8 further comprising locating means connected to each clamping gate of said pair of clamping gates, said locating means selectively securing said clamping gates in adjusted positions with respect to each other to locate said pair of rails to accommodate radiator headers of varying depths.

10. The fixture of claim 8 wherein said cross beam is mounted for rotation relative to said support frame means to enable rotation of said clamping gates and said radiator for access thereto for recoring operations.

11. The fixture of claim 8 further comprising mounting means for mounting said cross beam on said support frame means, said mounting means comprising a support bracket located centrally atop said cross beam; and further wherein said support frame means comprises a cantilevered member and an upright framework, said cantilevered member extending outwardly from the upper region of said support frame means and further including means for suspending said support bracket below said cantilevered member.

12. The fixture of claim 11 wherein said support bracket further comprises upwardly extending spaced bracket members and a bridge member joined to the upper ends of said outwardly extending bracket members wherein said actuator means is mounted therebetween, said actuator means further comprising an actuator rod extending through said cross beam and downwardly therefrom intermediate said clamping gates.

13. The fixture of claim 7 wherein said radiator is of the type utilizing soldered interconnections, and further wherein said upper surfaces of said pair of rails are flat and said pair of rails further comprise adjacent respective side surfaces, said adjacent respective side surfaces being squared off relative to said upper surfaces.

14. The fixture of claim 13 wherein each of said pair of rails is comprised of stainless steel.

15. The fixture of claim 7 wherein said actuator means comprises:

a fluid pressure cylinder interconnected with said clamping fixture and disposed above said pair of rails; and an actuator rod extending from said fluid pressure cylinder and selectively extendable, upon pressurization of said fluid pressure cylinder, downwardly towards said radiator tank.

16. The fixture of claim 15 wherein said hold down means further comprises a clamping bar pivotally mounted to the end of said actuator rod and a pair of hold down elements, each of said pair of hold down elements consisting of generally T-shaped elements, each of said T-shaped elements being provided with openings adapted to be received over said clamping bar with clearance therebetween to enable relative tilting to accommodate radiator tank top configurations of varying slope.

17. The fixture of claim 15 wherein said fluid pressure cylinder comprises an air cylinder and further wherein said actuator means further comprises regulator means for adjustably setting the air pressure applied to said fluid pressure cylinder to provide a predetermined clamping pressure to said radiator tank.

18. The fixture of claim 7 wherein said radiator is of the type utilizing tabs for interconnections and further wherein said upper surface of said pair of rails are provided with adjacent respective recesses, said peripheral flange of said radiator being at least partially received in said adjacent respective recesses when said radiator is mounted to said clamping fixture.

19. The fixture of claim 7 wherein said clamping fixture further comprises:
   a first alternate pair of rails, said first alternate pair of rails further comprising flat upper surfaces and adjacent respective side surfaces, said adjacent respective side surfaces being squared off relative to said flat upper surfaces; and
   a second alternate pair of rails, said second alternate pair of rails further comprising upper surfaces and adjacent respective recesses in said upper surfaces, said peripheral flange of said radiator being at least partially received in said adjacent respective recesses when said radiator is mounted to said clamping fixture;
   each of said first and second alternate pairs of rails being removably interconnected with said clamping fixture for supporting a radiator.

* * * * *

UNITED STATES PATENT AND TRADEMARK OFFICE
CERTIFICATE OF CORRECTION

PATENT NO. : 4,769,888
DATED : September 13, 1988
INVENTOR(S) : Richard Desiro

It is certified that error appears in the above-identified patent and that said Letters Patent is hereby corrected as shown below:

Column 1, after the title, insert "CROSS REFERENCE TO RELATED APPLICATIONS ----.

Column 2, line 63, delete "heater" and insert ---- header ----.

Column 6, line 3, delete "convenient" and insert ---- conventional ----.

Column 6, line 47, delete "heders" and insert ---- headers ----.

Column 8, line 3, after "88" delete the comma ---- , ----.

Signed and Sealed this

Sixteenth Day of May, 1989

Attest:

DONALD J. QUIGG

*Attesting Officer*  *Commissioner of Patents and Trademarks*